United States Patent
Sun et al.

(10) Patent No.: US 7,262,889 B2
(45) Date of Patent: *Aug. 28, 2007

(54) SYSTEM AND METHOD FOR VOLUME HOLOGRAPHIC IMAGING USING SPECTRAL ILLUMINATION

(75) Inventors: Wenyang Sun, Malden, MA (US); George Barbastathis, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 212 days.

This patent is subject to a terminal disclaimer.

(21) Appl. No.: 11/113,544

(22) Filed: Apr. 25, 2005

(65) Prior Publication Data

US 2006/0238842 A1 Oct. 26, 2006

(51) Int. Cl.
*G02B 5/32* (2006.01)
(52) U.S. Cl. .................... 359/15; 359/32; 356/328
(58) Field of Classification Search ............ 359/15, 359/32, 33; 356/328, 334
See application file for complete search history.

(56) References Cited

U.S. PATENT DOCUMENTS

| 3,013,467 A | 12/1961 | Minsky |
| 3,754,808 A * | 8/1973 | Clay et al. .................. 359/33 |
| 4,386,414 A | 5/1983 | Case |
| 4,752,130 A | 6/1988 | George et al. |
| 7,158,228 B2 * | 1/2007 | Psaltis et al. ............... 356/326 |
| 2004/0021871 A1 * | 2/2004 | Psaltis et al. ............... 356/451 |

OTHER PUBLICATIONS

Sun et al., "Rainbow volume holographic imaging" Lasers and Electro-Optics, 2004, (CLEO) vol. 2, May 20, 2004, pp. 1019-1020.
D. Huang et al., "Optical coherence tomography", Nov. 22, 1991, Science 254, pp. 1178-1181.
D.L. Marks, "Visible Cone-Beam Tomography With a Lensless Interferometric Camera", Jun. 25, 1999, Science 284, pp. 2164-2166.
A. Sinha et al., "Volume Holographic Imaging in Transmission Geometry", App. Opt., 43, 1533-1551, Mar. 2004.
Liu et al., "Real-time spectral imaging in three spatial dimensions", Optics Letters, vol. 27, No. 10, May 15, 2002, pp. 854-856.
G. Barbastathis et al., "Shift-Multiplexed Holographic Memory Using The Two-Lambda Method," Mar. 15, 1996, Optics Letters, 21(6), pp. 432-434.
G. Barbastathis et al., "Confocal Microscopy With A Volume Holographic Filter," Jun. 15, 1999, Optics Letters, 24(12), pp. 811-813.

(Continued)

Primary Examiner—Leonidas Boutsikaris
(74) Attorney, Agent, or Firm—Gauthier & Connors LLP

(57) ABSTRACT

A holographic imaging system is disclosed that includes a spectral electromagnetic field unit for providing a plurality of focal areas of a plurality of wavelengths of electromagnetic fields along a first direction, a lens system for directing the electromagnetic fields having the plurality of wavelengths from an object that may be positioned at least substantially near the plurality of focal areas toward a holographic recording, and a detector surface for receiving electromagnetic fields from the holographic recording.

18 Claims, 8 Drawing Sheets

OTHER PUBLICATIONS

G. Barbastathis et al., "Multidimensional Tomographic Imaging Using Volume Holography," Dec. 1999, Proceedings of the IEEE, 87(12), pp. 2098-2120.

G. Barbastathis et al., "Shift Multiplexing With Spherical Reference Waves," May 10, 1996, App. Opt. 35 (14), pp. 2403-2417.

G.W. Burr et al., "Effect Of The Oxidation of LiNbO3:Fe On the Diffraction Efficiency Of Multiple Holograms," Jun. 15, 1996, Optics Letters, 21(12), pp. 893-895.

J.P. Drolet et al., "Compact, Integrated Dynamic Holographic Memory With Refreshed Holograms", Apr. 15, 1997, Optics Letters, 22(8), pp. 552-554.

H. Lee, "Volume Holographic Interconnections With Maximal Capacity and Minimal Cross Talk", Mar. 15, 1989, J. Appl. Phys., 65(6), pp. 2191-2194.

W. Liu et al., "Pixel Size Limit In Holographic Memories", Oct. 1, 1999, Optics Letters, 24(19), pp. 1340-1342.

D. Psaltis et al., "Nonvolatile Storage In Photorefractive Crystals", Feb. 1, 1994, Optics Letters, 29(3), pp. 210-212.

J. Rosen et al., "General Theorem of Spatial Coherence Application To Three-Dimensional Imaging", Oct. 1996, J. Opt. Soc. Am. A., 12(10), pp. 2091-2095.

* cited by examiner

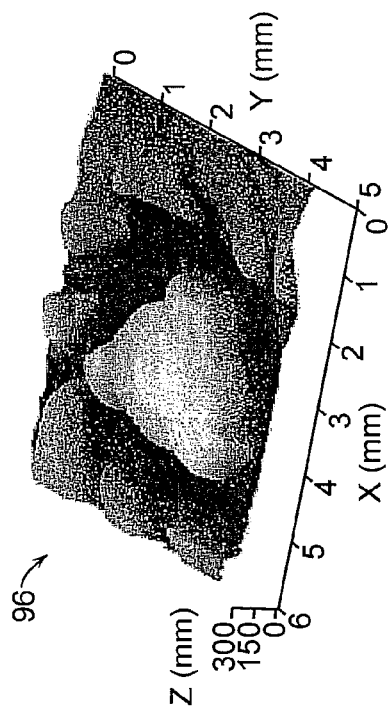
FIG. 9B
FIG. 9D
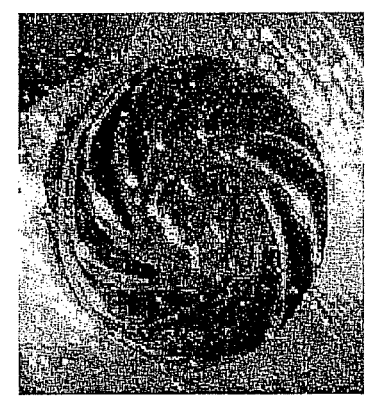
FIG. 9A
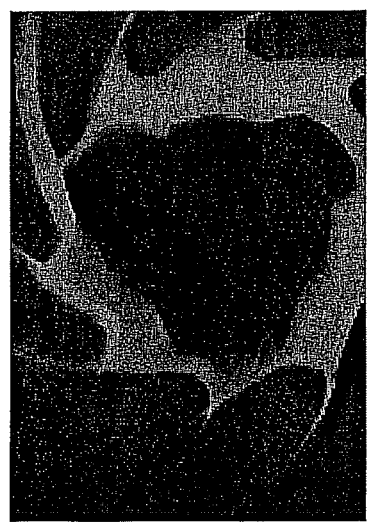
FIG. 9C

SYSTEM AND METHOD FOR VOLUME HOLOGRAPHIC IMAGING USING SPECTRAL ILLUMINATION

This invention was made with government support under Grant Number FO8630-00-1-0012, awarded by the Air Force. The government has certain rights in the invention.

BACKGROUND

The present invention relates generally to imaging systems, and in particular, to volume-holographic imaging systems having the capability to return three-dimensional spatial as well as spectral information.

Volume imaging systems may be used in applications such as bio-medical investigation, industrial product inspection, military reconnaissance etc. Certain conventional imaging systems for capturing image data of, for example, a semi-translucent three dimensional sample, such as biological or chemical sample, include confocal microscopy, interferometric profilometry, Moiré profilometry, and optical coherence tomography. The choice of imaging method depends, in part, on the required resolution, available working distance and nature of the object (e.g., reflective diffusive, semi-transparent, fluorescent etc). Such systems typically require scanning each point in an x by y scan plane for each of many scans along a z direction. Scanning along three dimensions is needed therefore, to acquire a series of planar scan images that are representative of a three dimensional sample.

Other imaging systems employ volume holograms to extract selected data from a sample. For example, U.S. Published Patent Application No. 2004/0021871 discloses a holographic imaging spectrometer that uses a volume hologram to extract a line image from a sample. As shown in FIG. 1, a volume hologram 10 having a thickness L may be recorded by interfering an object plane wave 12 with a reference plane wave 14. The volume hologram may then be used to process information from unknown complex incident waveforms. The spatial selectivity of Bragg matching in volume holograms makes it possible to selectively extract specific information from the input, and project the information onto one or more detectors. Illumination 16 is focused to form a probe point source 18 at the same wavelength as the reference and object waves 12 and 14 within a translucent three dimensional object 20 using an object lens 22. The resulting optical information may be collimated by a collimating lens 24 and directed toward the volume hologram 10 along the same direction that the object plane wave 12 approached the volume hologram 10 in recording the volume hologram. A holographic image in the form of a slit 26 that includes the optical information from the point 18 will be Bragg matched by the volume hologram and will be directed toward a collector lens 25 along the direction from which the reference plane wave approached the volume hologram during recording, but extending from the opposite side of the volume hologram as shown in FIG. 2A. The slit image 26 is created by Bragg matching, and may be projected onto a focal plane 28 of a detector. If the translucent three dimensional object 20 is moved along the y direction such that the probe point source is moved along the y axis, subsequent adjacent slices may be formed at the focal plane 28 of a detector. As shown in FIGS. 2B and 2C, a probe point source 30 may cause an image slit 32 to appear at one side of a detector surface, while a probe point source 34 and may case an image slit 34 to appear at an opposite side of a detector surface.

Scanning along the y direction, therefore, is required to form each planar scan image, and scanning along the z direction is required to develop a series of planar scan images that are representative of a three dimensional object.

There continues to be a need, therefore, for a three dimensional imaging system that does not require scanning along at least two dimensions.

SUMMARY

In accordance with an embodiment, the invention provides a holographic imaging system that includes a spectral electromagnetic field unit for providing a plurality of focal areas of a plurality of wavelengths of electromagnetic fields along a first direction, a lens system for directing the electromagnetic fields having the plurality of wavelengths from an object that may be positioned at least substantially near the plurality of focal areas toward a holographic recording, and a detector surface for receiving electromagnetic fields from the holographic recording.

In accordance with another embodiment, the invention provides a volume holographic imaging system that includes a spectral illumination unit for providing a plurality of focal areas of a plurality of wavelengths of illumination along a first direction, an optical system for directing multi-wavelength illumination from an object that may be positioned at least substantially near the plurality of focal areas toward a volume holographic recording, and a detector surface for receiving illumination from the volume holographic recording.

In accordance with a further embodiment, the invention provides a method of employing a volume hologram in imaging that includes the steps of providing a plurality of focal areas of a plurality of wavelengths of illumination along a first direction, directing illumination from the plurality of focal areas toward a volume holographic recording, and detecting illumination from the volume holographic recording that is representative of information regarding an object that is positioned at least proximate to the plurality of focal areas of a plurality of wavelengths of illumination.

BRIEF DESCRIPTION OF THE ILLUSTRATED EMBODIMENTS

The following description may be further understood with reference to the accompanying drawings in which:

FIGS. 9A-9D show illustrative diagrammatic views of reconstructed images of three dimensional object using a holographic imaging system in accordance with an embodiment of the invention.

The drawings are shown for illustrative purposes only and are not necessarily to scale.

DETAILED DESCRIPTION OF THE ILLUSTRATED EMBODIMENTS

In accordance with various embodiments, the invention provides a volume holographic imaging system that employs spectral illumination. High depth resolution is obtained since each quasi-monochromatic band of the spectral illumination acts as a depth-selective confocal slit. The color slits together in parallel achieve a wide field of view (FoV) and the need, therefore, to scan in one lateral dimension is eliminated. Experiments demonstrate a depth resolution of about <250 µm over about 15° field of view at 50 mm working distance.

The principle of volume holographic imaging is based on the rejection of out-of-focus light due to Bragg mismatch. Bragg degeneracy imposes a slit-like field of view as disclosed in U.S. Published Patent Application 2004/0021871, the disclosure of which is hereby incorporated by reference. If the coordinates are defined such that the z axis is the optical axis and the grating vector lies on the x-z plane, then the slit is oriented along the degeneracy direction y.

Figure 1:
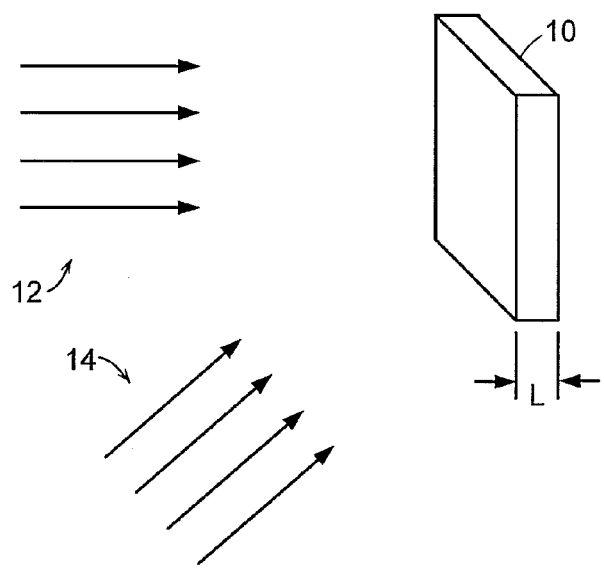
FIG. 1 shows an illustrative diagrammatic view of a volume hologram being recorded in accordance with the prior art.
Figure 2A:
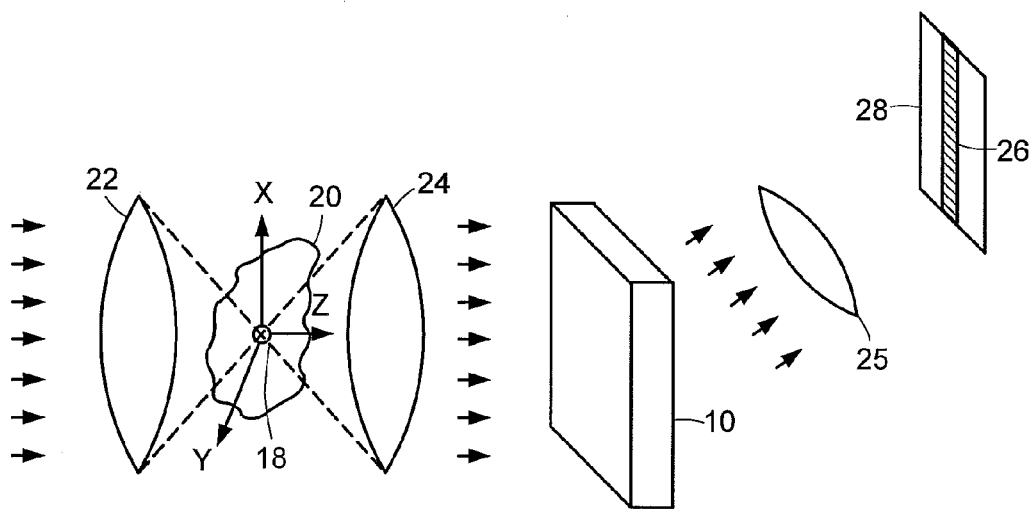
FIGS. 2A-2C show illustrative diagrammatic views of volume holographic imaging systems of the prior art that include the volume hologram of FIG. 1.
Figure 2B:
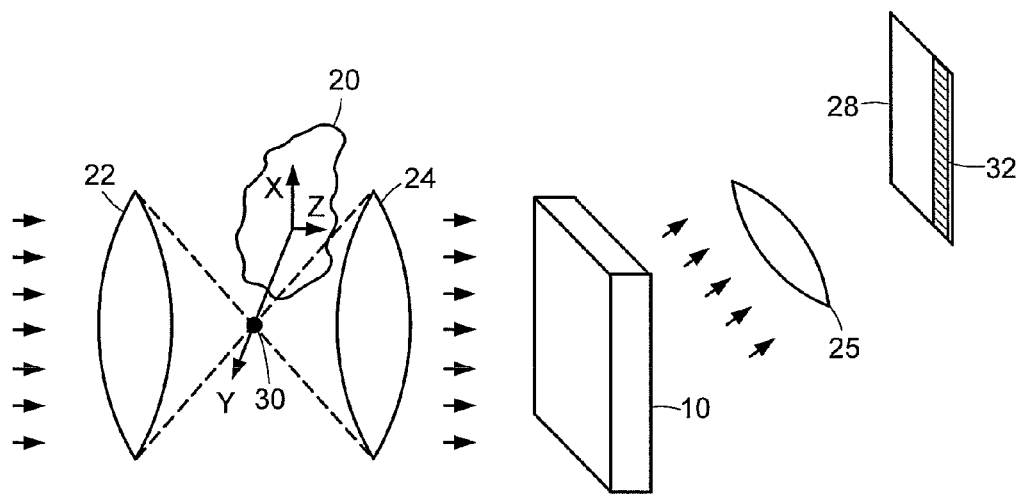
Figure 2C:
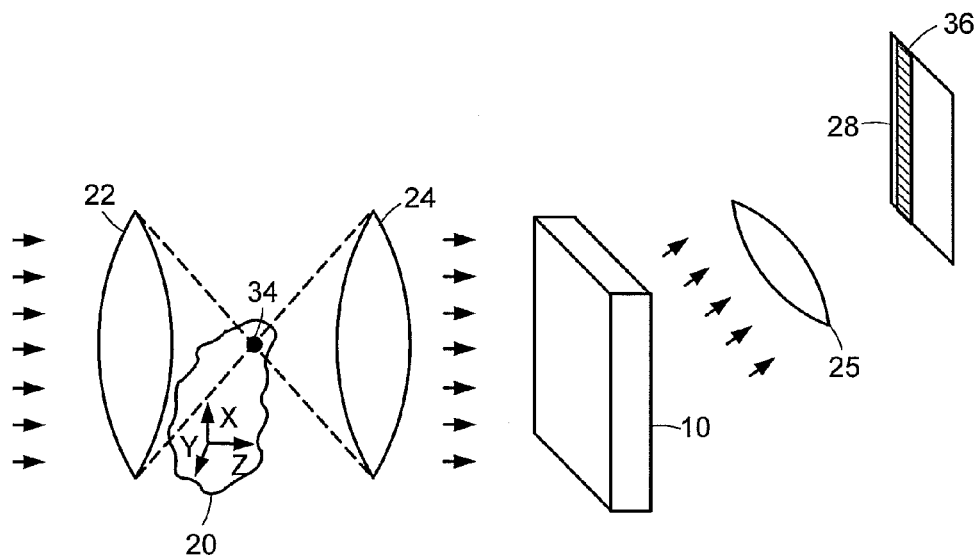
Figure 3:
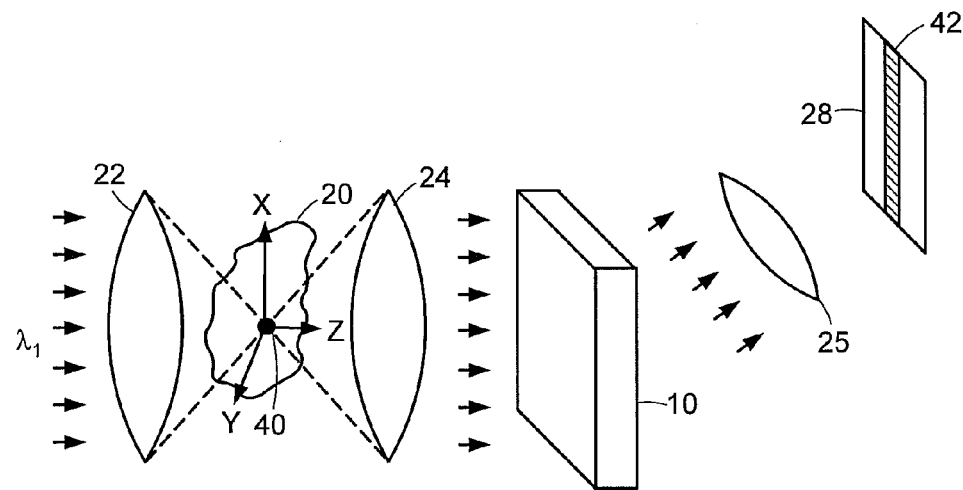
FIG. 3 shows an illustrative diagrammatic view of a holographic imaging system being used with probe point source illumination at a first wavelength in accordance with an embodiment of the invention.
Figure 4:
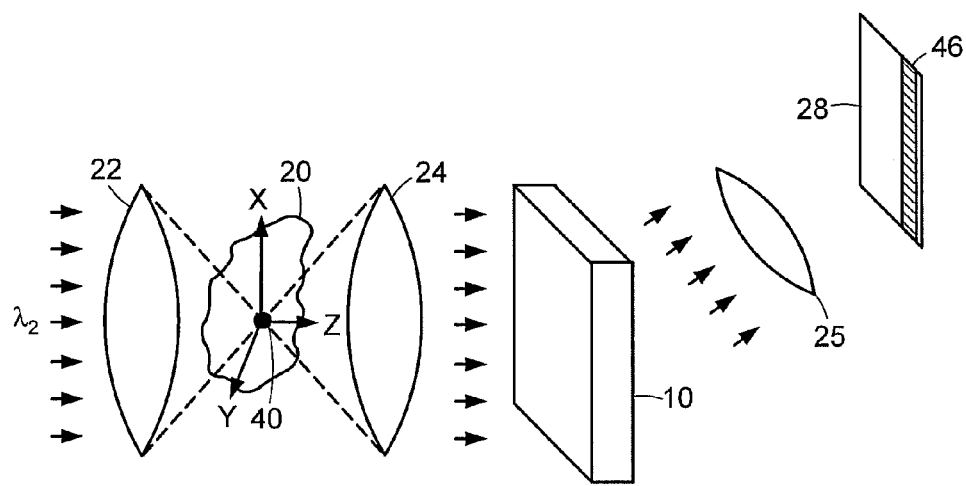
FIG. 4 shows an illustrative diagrammatic view of a holographic imaging system being used with probe point source illumination at a second wavelength in accordance with an embodiment of the invention.

As shown in FIGS. 3 and 4, applicants have discovered that while using a probe point source illumination 40 of a first wavelength $\lambda_1$ (e.g., the wavelength of the original object and reference waves used to create the volume hologram), causes a first image slit 42, using a probe point source illumination 40 of a second wavelength $\lambda_2$ causes a second image slit 46 to appear at a different location on the focal plane 28 of a detector. It has been further discovered that the spectrally different probe point source illumination need not be located at the same location as the probe point source 40, but may be located along the y axis. Spectral (or rainbow) illumination may therefore be directed along the y axis at the same time to provide multiple image slits at the focal plane of the detector in accordance with an embodiment of the invention. White light may be provided to a spectral diffraction structure that provides the spectrally dispersed illumination along a line.

Figure 5:
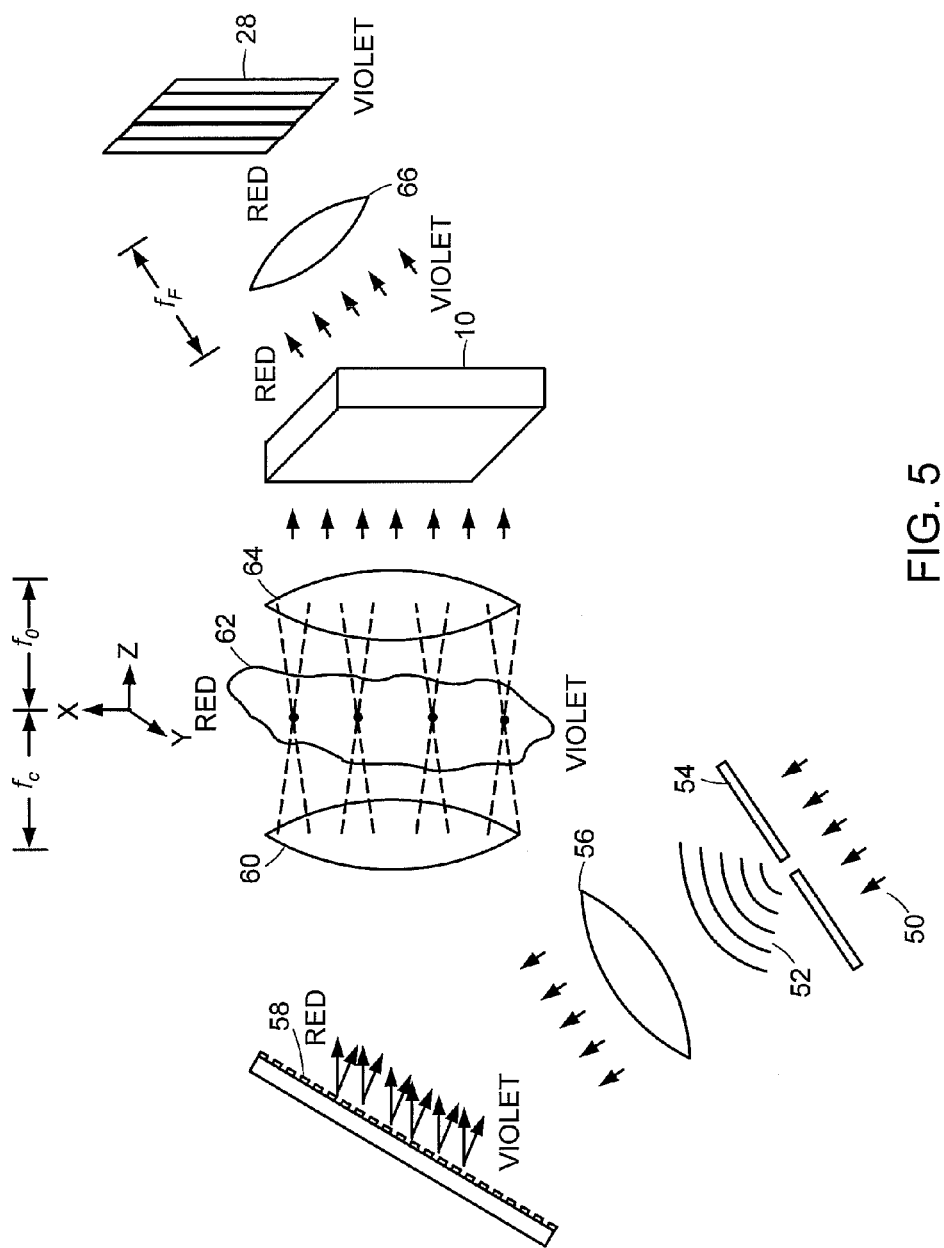
FIG. 5 shows an illustrative diagrammatic view of a holographic imaging system being used spectral illumination in accordance with an embodiment of the invention involving a translucent sample.
Figure 6:
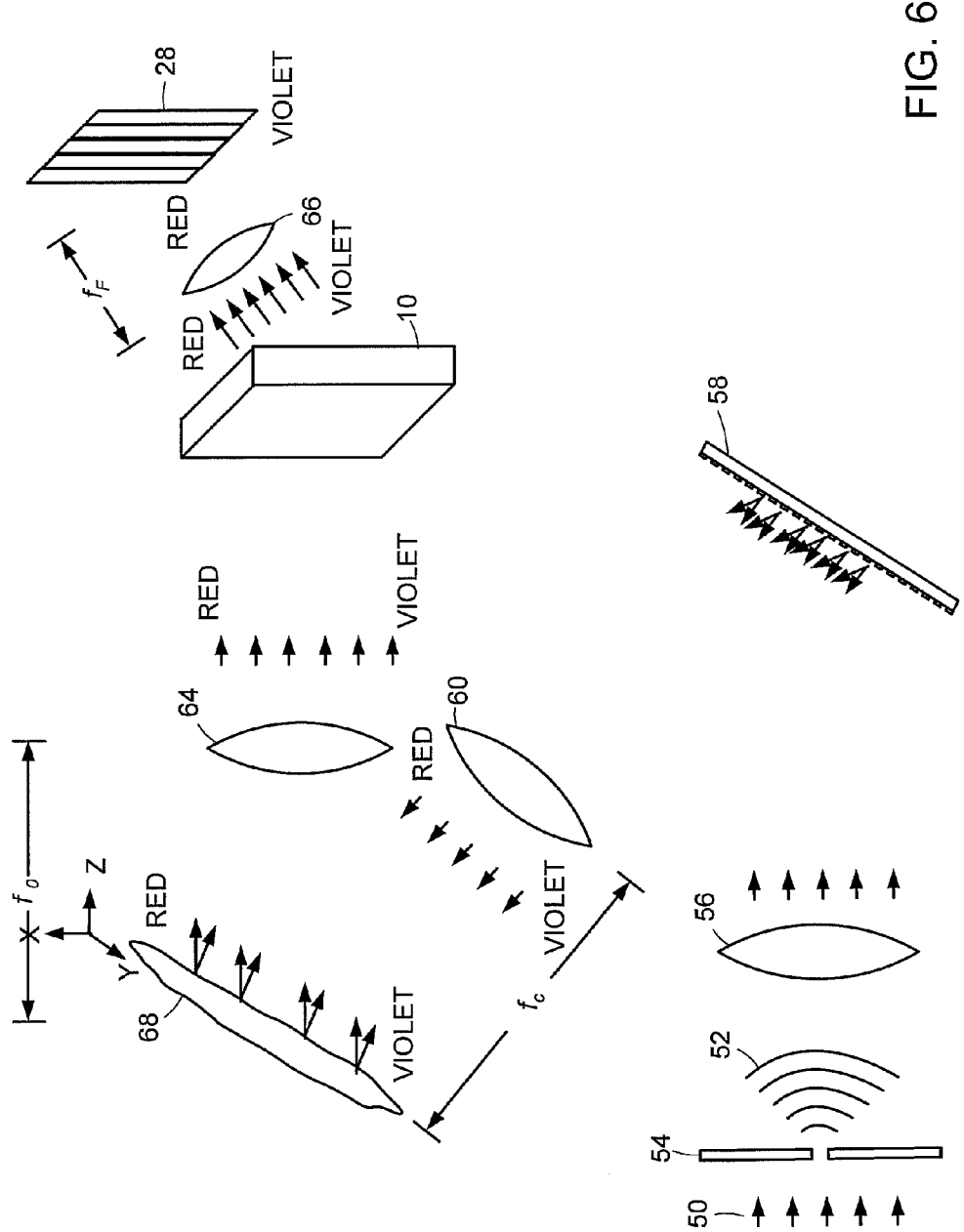
FIG. 6 shows an illustrative diagrammatic view of a holographic imaging system being used spectral illumination in accordance with an embodiment of the invention involving a reflective sample.

With reference to FIG. 5, the illumination system for the object may consist of a collimated white light source 50, that is converted to a point source 52 by a pin hole mask 54, a lens 56, a diffraction grating 58, and an achromatic cylindrical lens 60 (focal length $f_c$) that focuses each color into a strip. The color strips are oriented in they dimension. The object 62 is placed in the vicinity of the focal plane of the cylindrical lens 60. The light from the object is first directed to an objective lens 64 (focal length $f_o$), and then diffracted from the volume hologram 10. A digital camera is placed in the diffracted beam direction, at the Fourier plane of the collector lens 66 (focal length $f_F$). With reference to FIG. 6, a system in accordance with another embodiment of the invention may be similar to that of FIG. 5 (wherein like reference numerals designate like elements) except that the object 68 may be reflective, and the spectral illumination may be directed toward and reflected by the object 68 along the y axis.

The portions of the object surface that are out of focus within each color strip will be Bragg mismatched and photons originated from that area will not reach the camera. On the other hand, the portions of the object surface that are in focus will be Bragg matched so that they can be imaged. This happens simultaneously for all color strips if the mean wavelength $\bar{\lambda}$, the diffraction grating period $\Lambda$ and the signal beam angle $\theta_s$ of the hologram satisfy the condition $$\frac{f_c}{\Lambda} \approx \frac{\theta_s f_o}{2\bar{\lambda}} \tag{1}$$

in the paraxial approximation (angles and wavelengths are quoted in air). With this arrangement, depth-selective images are obtained simultaneously over the entire illuminated surface, i.e. from each color in the rainbow. Scanning along z is still necessary to recover the full object shape. The field of view $FoV_x$ along the x dimension is only limited by the size of the camera and the bandwidth B of the rainbow. Assuming the latter is the limiting factor, the $FoV_x$ is given by $$FoV_x = \frac{B\theta_s}{\bar{\lambda}}(\text{rad}). \tag{2}$$

Figure 7:
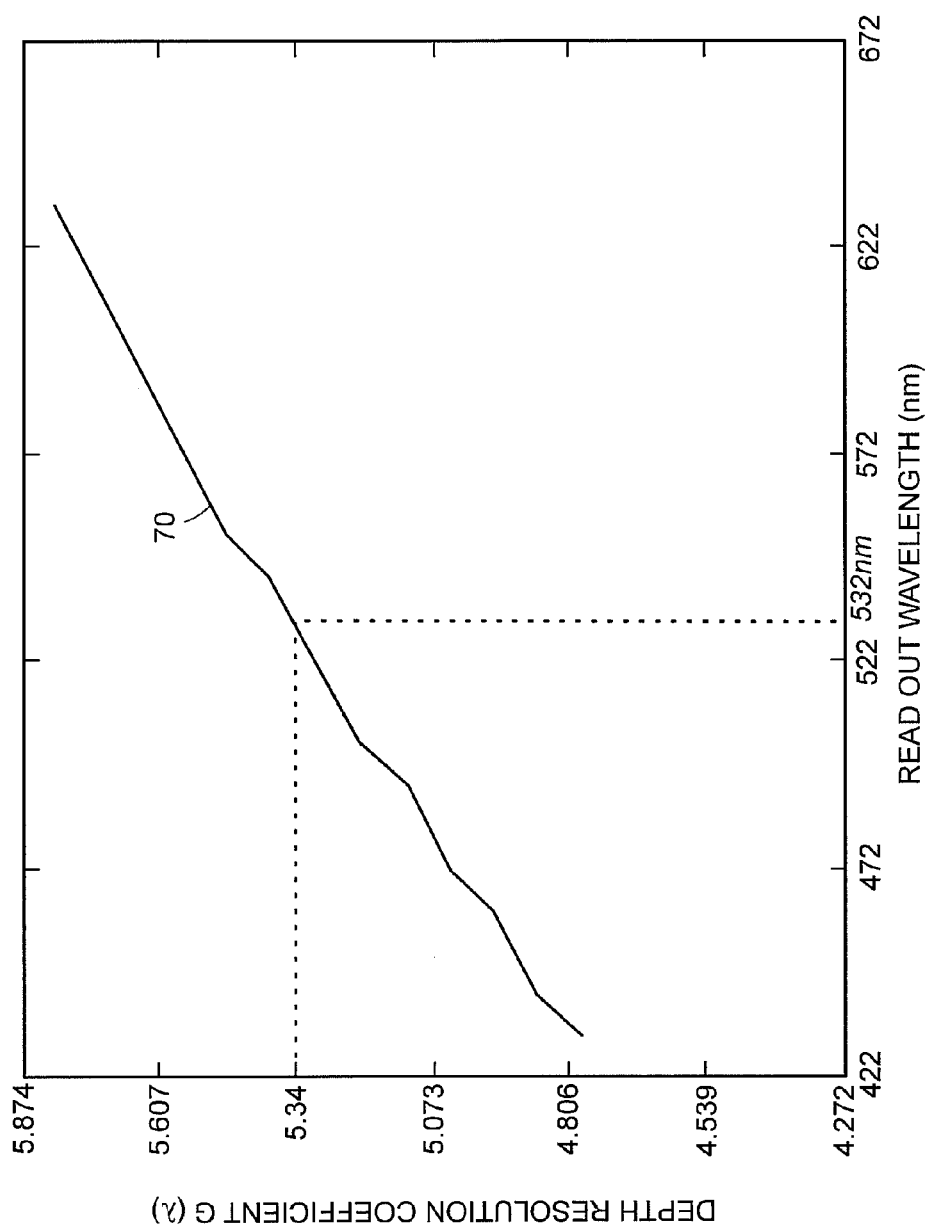
FIG. 7 shows an illustrative graphical representation of the numerical calculation of the wavelength dependent coefficient for use in accordance with an embodiment of the invention.

The depth resolution of such a system may be defined as the full width at half maximum (FWHM) of the point-spread function (PSF) in the z direction. The FWHM is obtained from three-dimensional diffraction theory and it is given, approximately, by $$\Delta z_{FWHM} = G(\lambda) \cdot \frac{\lambda f_o^2}{\theta_s aL}, \tag{3}$$

where $\alpha$ is the hologram aperture radius, L is the hologram thickness, and $G(\lambda)$ is a wavelength-dependent coefficient calculated numerically and shown at 70 in FIG. 7. At $\lambda$=532 nm, G=5.34. The weak dependence of depth selectivity on wavelength is re-calibrated during post-processing in our experiments.

An experimental setup was constructed similar to the system shown in FIG. 6. A halogen lamp with B=650 nm-400 nm was used as light source. The spectral illumination was projected to the object plane using a blazed grating with 1/$\Lambda$=600 mm$^{-1}$ and a cylindrical lens with $f_c$=25 mm. Two achromatic spherical lenses were used as objective and collector with $f_o$=$f_F$=50 mm. The volume hologram had a thickness of L=0.2 mm and a signal beam angle $\theta_s$=30° and was pre-recorded. A Newport 2832-C optical power meter (sold by Newport Corporation of Irvine, Calif.) was used to measure the longitudinal PSF, i.e. the diffracted power as function of z integrated across the entire rainbow field of view.

Figure 8:
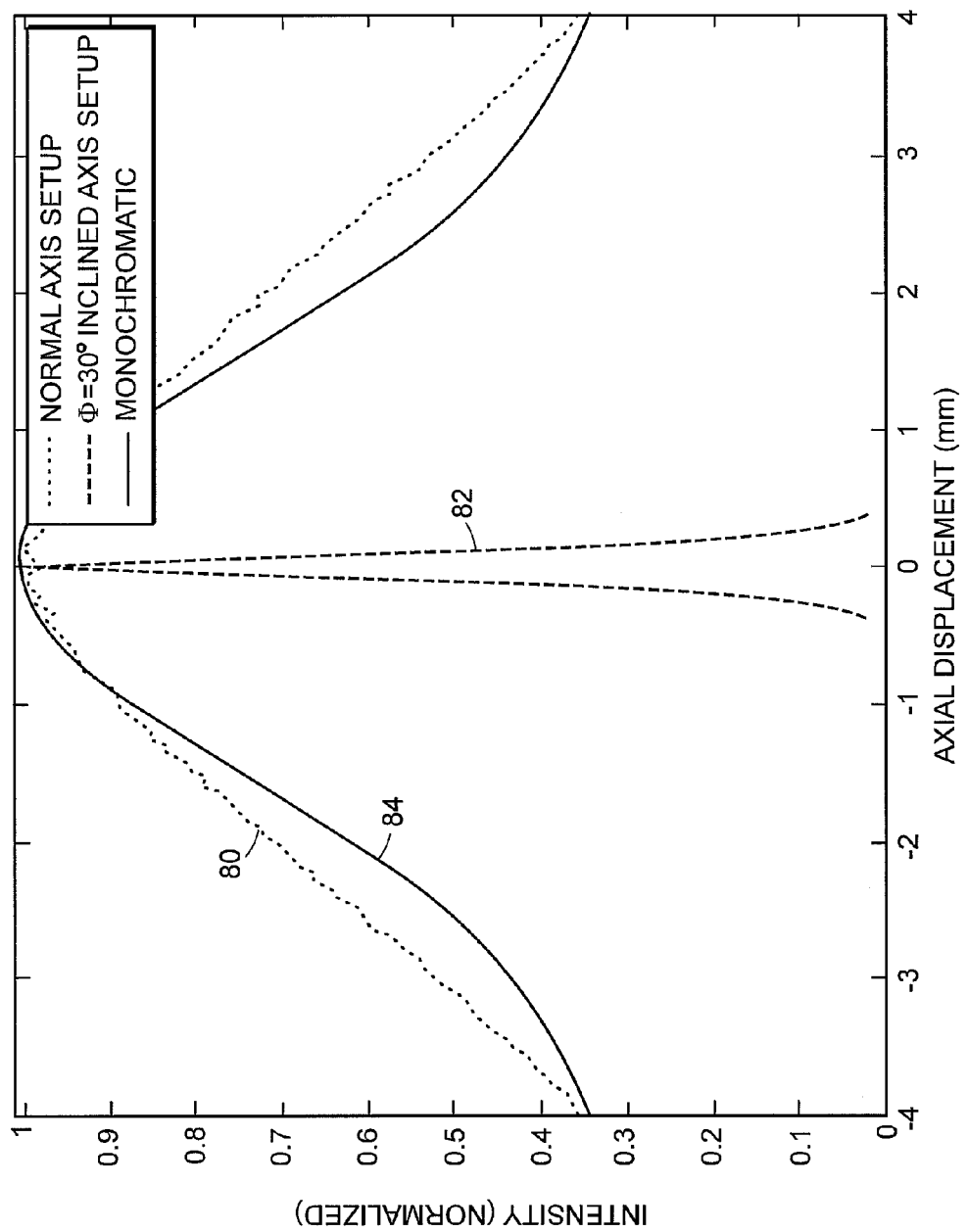
FIG. 8 shows an illustrative graphical representation of the measured depth point spread function in a volume holographic imaging system in accordance with an embodiment of the invention.

FIG. 8 shows the measured depth PSF of a system for both normal (as shown at 80) and $\phi$=30° inclined illumination (as shown at 82). It is seen that the PSF of the system drops off slightly slower than its monochromatic laser illumination VHI counterpart (as shown at 84), due to the $G(\lambda)$ dependence Equation (3) above.

The same experimental setup was used to demonstrate image acquisition with a system in accordance with an embodiment of the invention. A Newport CMA-25CCCL actuator was used for longitudinal scanning, and a monochrome 752×480 pixel JAI CCD camera was used to acquire the raw images. FIG. 9A shows at 90 a micro-fabricated micro turbine with approximately 250 m feature depth and 9 mm diameter, illuminated by the rainbow. FIGS. 9B and 9C show the raw images (at 92 and 94 respectively) acquired by the system at two different longitudinal positions, separated by 250 m, with inclined illumination at $\phi=30°$. The effective FoV provided by the rainbow was approximately 15°, according to Equation (2) above, and was larger than the object window. FIG. 9D shows at 96 the reconstructed shape of the micro-turbine from a total of N=8 raw images. Note that the object had only two depth levels, but N>2 was necessary because the illumination was inclined.

Systems and methods are presented, therefore, for using rainbow illumination and a volume hologram to achieve broad FoV without sacrificing depth selectivity. Experiments showed resolution and image quality comparable to monochrome volume hologram imaging, but with much reduced scanning time. Such system may be used, for example, for real-time 3D microscopy for fast biomedical process observation, oOn board AUV 3D imaging and sensing for military target reconnaissance, industrial online real-time product quality inspection, and micro-fabrication process and product inspection.

Those skilled in the art will appreciate that numerous modifications and variations may be made to the above disclosed embodiments without departing from the spirit and scope of the invention.

What is claimed is:

1. A holographic imaging system comprising:
   a spectral electromagnetic field means for providing a plurality of focal areas of a plurality of wavelengths of electromagnetic fields along a first direction, said plurality of focal areas of a plurality of wavelengths providing a plurality of probe point sources of the plurality of wavelengths, and said plurality of focal areas being each coincident with a portion of an object to be probed;
   a lens means for directing the electromagnetic fields having the plurality of wavelengths from the object toward a holographic recording; and
   a detector surface for receiving electromagnetic fields from the holographic recording.

2. The holographic imaging system as claimed in claim 1, wherein said spectral electromagnetic field means further includes a diffraction grating.

3. The holographic imaging system as claimed in claim 1, wherein said holographic recording is provided within a volume hologram.

4. The holographic imaging system as claimed in claim 1, wherein said electromagnetic fields from the holographic recording is received at the detector surface via a collector lens system.

5. The holographic imaging system as claimed in claim 1, wherein each of said plurality of wavelengths of electromagnetic fields provides for a slit portion of an image to be provided at the detector surface.

6. The holographic imaging system as claimed in claim 5, wherein said slit portions of the images are provided at the detector surface at the same time.

7. The holographic imaging system as claimed in claim 1, wherein said first direction is substantially parallel with the detector surface.

8. A volume holographic imaging system comprising:
   a spectral illumination means for providing a plurality of focal areas of a plurality of wavelengths of illumination along a first direction, said plurality of focal areas of a plurality of wavelengths providing a plurality of probe point sources of the plurality of wavelengths, and said plurality of focal areas being each coincident with a portion of an object to be probed;
   an optical system for directing multi-wavelength illumination from the object toward a volume holographic recording; and
   a detector surface for receiving illumination from the volume holographic recording.

9. The volume holographic imaging system as claimed in claim 8, wherein said spectral illumination means further includes a diffraction grating.

10. The volume holographic imaging system as claimed in claim 8, wherein said illumination from the volume holographic recording is received at the detector surface via a collector lens system.

11. The volume holographic imaging system as claimed in claim 8, wherein each of said plurality of wavelengths of illumination provides for a slit portion of an image to be provided at the detector surface.

12. The volume holographic imaging system as claimed in claim 11, wherein said slit portions of the images are provided at the detector surface at the same time.

13. The volume holographic imaging system as claimed in claim 8, wherein said first direction is substantially parallel with the detector surface.

14. A method of employing a volume hologram in imaging, said method comprising the steps of:
   providing a plurality of focal areas of a plurality of wavelengths of illumination along a first direction, said plurality of focal areas of a plurality of wavelengths providing a plurality of probe point sources of the plurality of wavelengths, and said plurality of focal areas being each coincident with a portion of an object to be probed;
   directing illumination from the plurality of focal areas toward a volume holographic recording; and
   detecting illumination from the volume holographic recording that is representative of information regarding the object.

15. The method as claimed in claim 14, wherein said step of providing a plurality of focal areas of a plurality of wavelengths of illumination includes directing polychromatic illumination onto a diffraction grating.

16. The method as claimed in claim 14, where said first direction is substantially parallel with a surface of a detector that is employed to detect the illumination from the volume holographic recording.

17. The method as claimed in claim 14, wherein said method further includes the step of directing said plurality of wavelengths of illumination through an object to be imaged.

18. The method as claimed in claim 14, wherein said method further includes the step of reflecting said plurality of wavelengths of illumination from an object to be imaged.

* * * * *